(12) United States Patent
Kim

(10) Patent No.: US 8,330,623 B2
(45) Date of Patent: Dec. 11, 2012

(54) METHOD AND APPARATUS FOR RECOGNIZING PARKING AREA

(75) Inventor: Dong-suk Kim, Ansan (KR)

(73) Assignee: Mando Corporation, Pyeongtaek (KR)

( * ) Notice: Subject to any disclaimer, the term of this patent is extended or adjusted under 35 U.S.C. 154(b) by 572 days.

(21) Appl. No.: 12/606,395

(22) Filed: Oct. 27, 2009

(65) Prior Publication Data

US 2010/0134321 A1 Jun. 3, 2010

(30) Foreign Application Priority Data

Dec. 2, 2008 (KR) .................. 10-2008-0121046

(51) Int. Cl.
*G08G 1/14* (2006.01)
(52) U.S. Cl. .............. 340/932.2; 340/903; 340/943; 340/539.21; 340/435; 367/87; 367/99
(58) Field of Classification Search .......... 340/435, 340/539.21, 903, 932.2, 943; 342/118; 367/87–116
See application file for complete search history.

(56) References Cited

U.S. PATENT DOCUMENTS

| 6,943,726 B2 * | 9/2005 | Schneider | 342/70 |
| 7,660,205 B2 * | 2/2010 | Barth et al. | 367/99 |

* cited by examiner

*Primary Examiner* — George Bugg
*Assistant Examiner* — Sharmin Akhter
(74) *Attorney, Agent, or Firm* — McDermott Will & Emery LLP

(57) ABSTRACT

A method and an apparatus for recognizing a parking area are disclosed. The parking area recognizing apparatus includes: a signal transmitter transmitting a signal using a sensor; an echo signal receiver receiving an echo signal for the signal; a multiple signal generator generating a multiple echo signal using the echo signal based on first and second preset thresholds; and a parking area recognizer recognizing a parking area by calculating a round trip time and a duration time for the multiple echo signal and selecting an available echo signal based on at least one of the round trip time and the duration time. Accordingly, a precision in recognition of a parking area is enhanced by reducing a measurement error by processing an echo signal received after it is reflected on an object with a multiple echo signal in recognition of the parking area using a sensor such as an ultrasonic sensor or a radar sensor.

5 Claims, 6 Drawing Sheets

METHOD AND APPARATUS FOR RECOGNIZING PARKING AREA

CROSS-REFERENCE OF RELATED APPLICATIONS

This application claims the benefit and priority of Korean Patent Application No. 10-2008-0121046 filed Dec. 2, 2008. The entire disclosure of the above application is incorporated herein by reference.

BACKGROUND OF THE INVENTION

1. Field of the Invention

The present invention relates to a method and an apparatus for recognizing a parking area, and more particularly to a method and an apparatus for recognizing a parking area that enhances a precision in recognition of a parking area by reducing a measurement error when the parking area is recognized using an ultrasonic sensor.

2. Description of the Prior Art

In an existing parking area recognizing method, a vehicle recognizes a parking area by transmitting an ultrasonic signal to an object through an ultrasonic sensor, by receiving an ultrasonic echo signal obtained when the transmitted ultrasonic signal returns to the vehicle after it is reflected on the object, by measuring a transmission time and a reception time to calculate a round trip time, and by calculating the distance from the object using the calculated round trip time.

However, in the existing parking area recognizing method, since the angle between an ultrasonic sensor of a vehicle and an object is not measured, the parking area is recognized by calculating a round trip time and the distance from the object with the assumption that the object is in front of the ultrasonic sensor. That is, in the existing parking area recognizing method, since a round trip time and the distance from an object obtained using it contain error components, the measured length of the object calculated using the distance from the object may be longer or shorter than the actual length of the object, causing a mistaken result in recognition of a parking area.

SUMMARY OF THE INVENTION

Accordingly, the present invention has been made to solve the above-mentioned problems occurring in the prior art, and an object of the present invention is to provide a method and an apparatus for recognizing a parking area that enhances a precision in recognition of a parking area by reducing a measurement error when the parking area is recognized using an ultrasonic sensor.

In order to accomplish this object, there is provided a parking area recognizing apparatus including: a signal transmitter transmitting a signal using a sensor; an echo signal receiver receiving an echo signal for the signal; a multiple signal generator generating a multiple echo signal using the echo signal based on first and second preset thresholds; and a parking area recognizer recognizing a parking area by calculating a round trip time and a duration time for the multiple echo signal and selecting an available echo signal based on at least one of the round trip time and the duration time.

In accordance with another aspect of the present invention, there is provided a parking area recognizing method including the steps of: transmitting a signal using a sensor; receiving an echo signal for the signal; generating a multiple echo signal using the echo signal based on first and second preset thresholds; calculating a round trip time and a duration time for the multiple echo signal and selecting an available echo signal based on at least one of the round trip time and the duration time; and recognizing a parking area based on the available echo signal.

The first threshold is smaller than the second threshold, and the parking area recognizer calculates round trip times and duration times for the first square wave and the second square wave contained in the generated echo signal and determines that the echo signal is not available when the distance difference calculated using the first rising time points of the first square wave and the second square wave deviates from a range and/or when a duration time for the first square wave is no more than a preset available duration time.

Therefore, a precision in recognition of a parking area is enhanced by reducing a measurement error by processing an echo signal received after it is reflected on an object with a multiple echo signal in recognition of the parking area using a sensor such as an ultrasonic sensor or a radar sensor.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
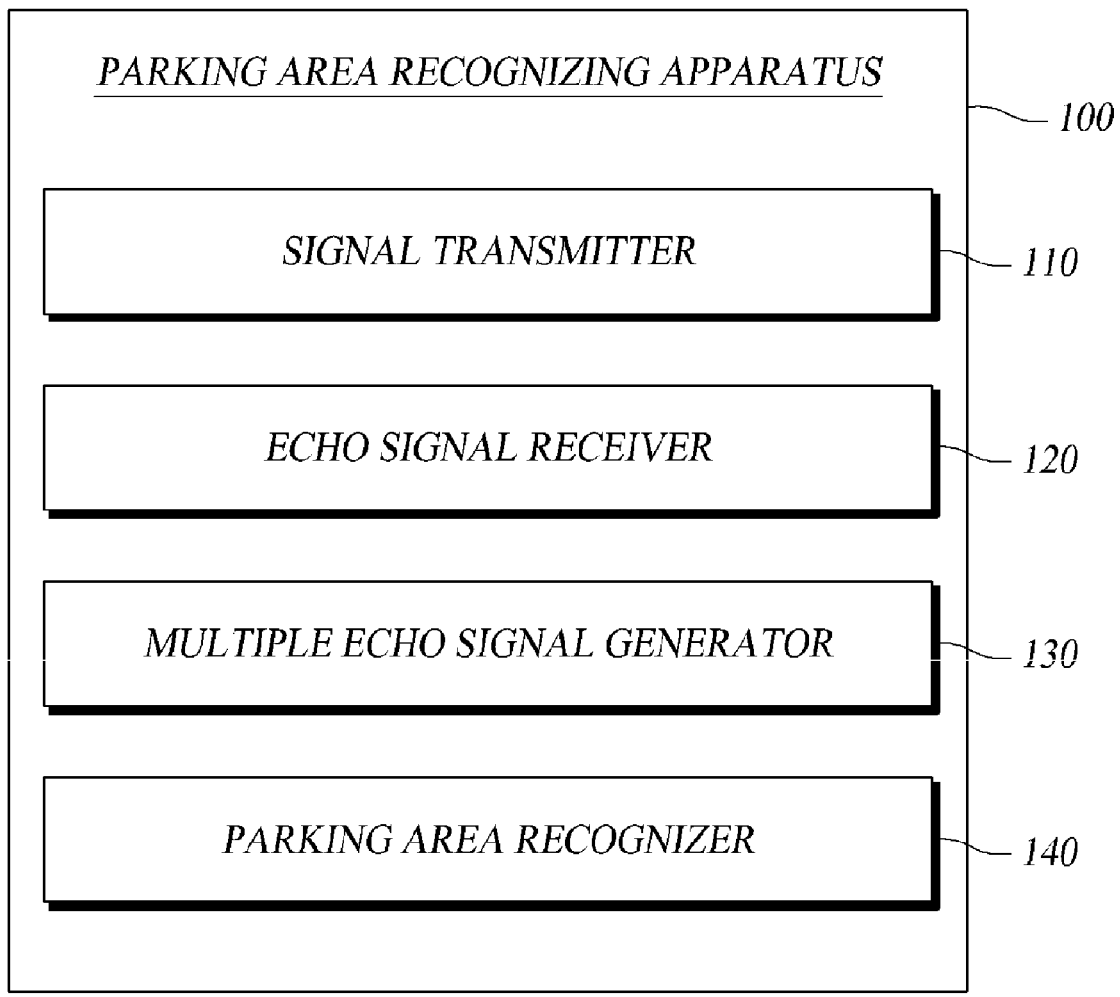
FIG. 1 is a block diagram of a parking area recognizing apparatus according to an embodiment of the present invention.

Hereinafter, a preferred embodiment of the present invention will be described with reference to the accompanying drawings. It is apparent that the same reference numerals are used to designate the same or similar components in adding them to the elements of the drawings even when they are displayed in different drawings. Moreover, in the description of the present invention, well-known configurations and functions are not set forth in detail in order to avoid obscuring the scope of the invention.

In the description of the elements of the present invention, the terms 'first', 'second', 'A', 'B', '(a)', and '(b)' may be used. However, since the terms are used only to distinguish an element from another, the essence, sequence, and order of the elements are not limited by them. When it is described that an element is "coupled to", "engaged with", or "connected to" another element, it should be understood that the element may be directly coupled or connected to the other element but still another element may be "coupled to", "engaged with", or "connected to" the other element between them.

FIG. 1 is a block diagram of a parking area recognizing apparatus 100 according to an embodiment of the present invention.

Referring to FIG. 1, the parking area recognizing apparatus 100 according to the embodiment of the present invention includes a signal transmitter 110 transmitting a signal using a sensor; an echo signal receiver 120 receiving an echo signal generated when the transmitted signal returns to the sensor after it is reflected on an object; a multiple echo signal generator 130 generating a multiple echo signal using the received echo signal based on first and second preset thresholds; and a parking area recognizer 140 recognizing a parking area by calculating round trip times and duration times for the generated multiple echo signal and selecting an available echo signal based on the round trip times and the duration times.

The signal transmitter 110 transmits a signal using a sensor such as an ultrasonic sensor or a radar sensor, and then the available beam width of the transmitted signal can be adjusted. For example, the available beam width may be 15 to 50 degrees.

The multiple echo signal generator 130 generates a multiple echo signal including a first square wave obtained using a first threshold by comparing the signal strength of a received echo signal with the first threshold and a second square wave obtained using a second threshold by comparing the strength of the echo signal with the second threshold. Then, as an example, the first threshold and the second threshold may be set such that the first square wave and the second square wave can be generated based on the signal strength of the received echo signal and can be modified based on a precision in recognition of a parking area. The first threshold may be set in advance to be smaller than the second threshold.

That is, each square wave has an upper section (the upper portion of the square wave) where the strength of an echo signal is not less than a threshold and a lower section where the strength of the echo signal is no more than the threshold and whose value is null. This will be described below in more detail with reference to FIG. 5.

The parking area recognizer 140 calculates round trip times and duration times for the first square wave and the second square wave contained in the generated echo signal, and determines that the echo signal is not available when the distance difference calculated using the first rising time points of the first square wave and the second square wave deviates from a range.

The parking area recognizer 140 may determine that the echo signal is not available when a duration time for the first square wave is no more than a preset available duration time.

Accordingly, a parking area can be accurately recognized by determining only an echo signal and calculating the distance from an object based on the determined echo signal to create a map.

Figure 2:
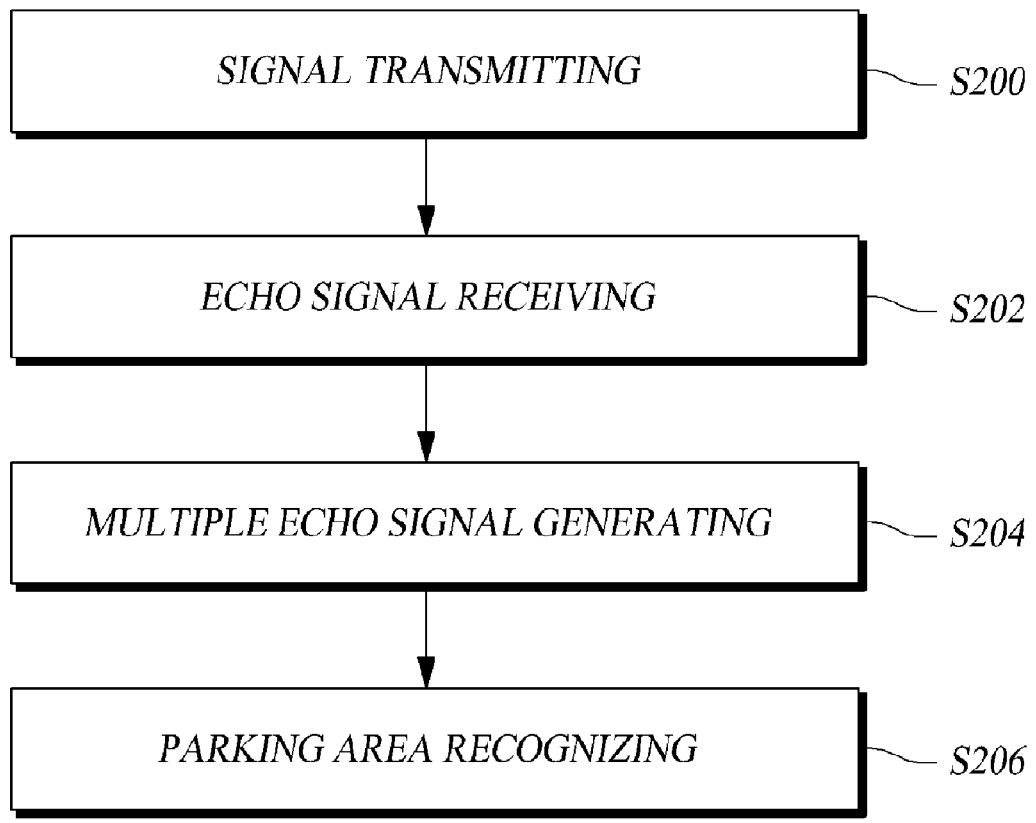
FIG. 2 is a flowchart of a parking area recognizing method according to an embodiment of the present invention.

FIG. 2 is a flowchart of a parking area recognizing method according to an embodiment of the present invention.

Referring to FIG. 2, the parking area recognizing method provided by the parking area recognizing apparatus 100 according to the embodiment of the present invention includes the steps of: transmitting a signal using a sensor such as an ultrasonic sensor or a radar sensor (S200); receiving an echo signal for the transmitted signal (S202); generating a multiple echo signal using the received echo signal based on first and second preset thresholds (S204); and recognizing a parking area by calculating round trip times and duration times for the generated multiple echo signal, by determining an available echo signal based on at least one of the trip times and the duration times, and by calculating the distance from an object based on the determined available echo signal (S206).

In the step of generating a multiple echo signal (S204), the multiple echo signal includes a first square wave obtained using a first threshold by comparing the signal strength of a received echo signal with the first threshold and a second square wave obtained using a second threshold by comparing the strength of the echo signal with the second threshold.

As an example, the first threshold and the second threshold may be set such that the first square wave and the second square wave can be generated based on the signal strength of the received echo signal and can be modified based on a precision in recognition of a parking area. The first threshold may be set in advance to be smaller than the second threshold.

Figure 3:
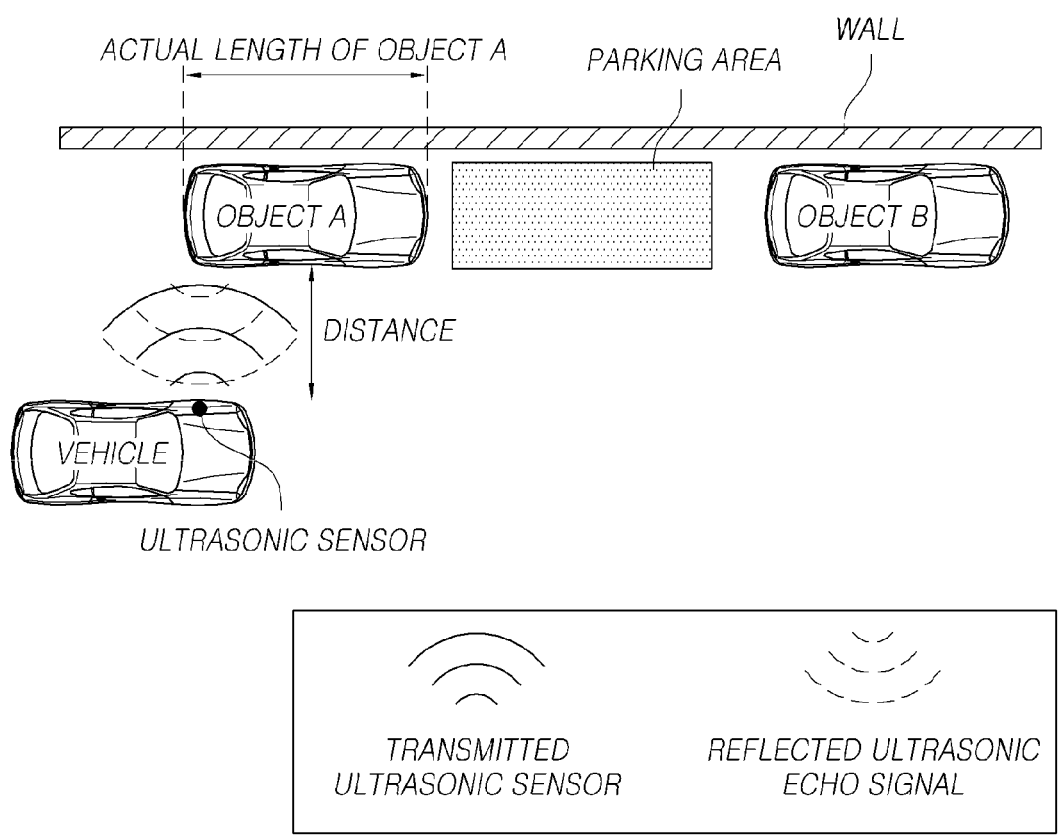
FIG. 3 is a view illustrating an example of the parking area recognizing method according to the embodiment of the present invention.

FIG. 3 is a view for explaining an example of the parking area recognizing method according to the embodiment of the present invention.

FIG. 3 is an example of the parking area recognizing method according to the embodiment of the present invention and illustrates recognition of a parking area between an object A and another object B by the parking area recognizing apparatus 100 mounted to a vehicle X using the parking area recognizing method according to the embodiment of the present invention in order to safely park the vehicle X in the parking area between the object A and the object B. Here, the sensor used in the parking area recognizing apparatus 100 mounted to the vehicle X is assumed to be an ultrasonic sensor.

Referring to FIG. 3, the vehicle X needs to accurately measure the distances from the object A, the wall, and the object B in order to accurately recognize the parking area between the object A and the object B.

To achieve this, in an existing parking area recognizing method, a vehicle recognizes a parking area by transmitting an ultrasonic signal to the object A, the wall, and the object B through an ultrasonic sensor, by receiving ultrasonic echo signals obtained when the transmitted ultrasonic signal returns to the vehicle after it is reflected on the object A, the wall, and the object B, by measuring a transmission time and reception times to calculate round trip times, and by calculating the distances from the object A, the wall, and the object B using the calculated round trip times. Here, a square wave (refer to FIG. 4B) is obtained from the received ultrasonic echo signal (refer to FIG. 4A) having a signal strength exceeding a threshold to calculate a round trip time, but since the angles between the ultrasonic sensor and the object A, the wall, and the object B cannot be measured, the round trip time is calculated with the assumption that the object is in front of the ultrasonic sensor. Therefore, since the round trip time and the distance calculated using the round trip time contain error components, the measured distance is longer or shorter than the actual length, a length different from the actual length of the parking area may be recognized.

In the parking area recognizing method according to the embodiment of the present invention, the parking area recognizing apparatus 100 mounted to the vehicle X transmits an ultrasonic signal to the object A, the wall, and the object B, receives ultrasonic echo signals that return to the vehicle X after the transmitted ultrasonic signal is reflected on the object A, the wall, and the object B, and generates a multiple echo signal from each received ultrasonic echo signal using a preset first threshold and a second threshold higher than the first threshold.

Thereafter, meaningless and unavailable information (echo signal) is removed from information regarding round trip times and duration times calculated using the generated multiple echo signal, and only an effective echo signal is extracted to calculate the distance from the object A, the wall, and the object B and recognize a parking area.

Figure 5:
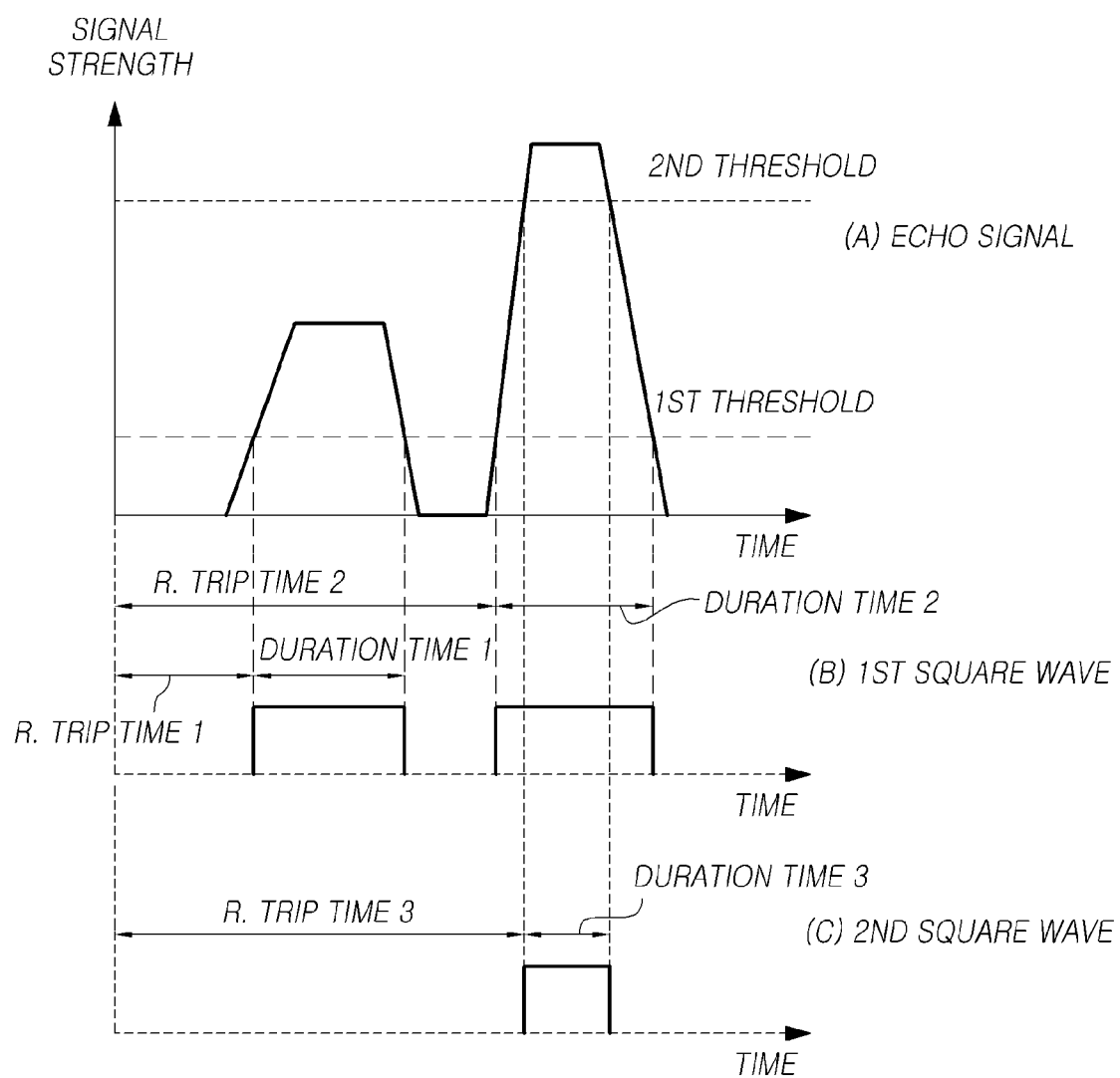
FIG. 5 is a graph for explaining recognition of a parking area by generating a multiple echo signal having a first square wave and a second square wave from an echo signal and calculating the distance from an object using the multiple echo signal in a parking area recognizing method according to the embodiment of the present invention.

FIG. 5 is a graph for explaining recognition of a parking area by generating a multiple echo signal having a first square wave and a second square wave from an echo signal and calculating the distance from an object using the multiple echo signal in a parking area recognizing method according to the embodiment of the present invention.

Figure 4:
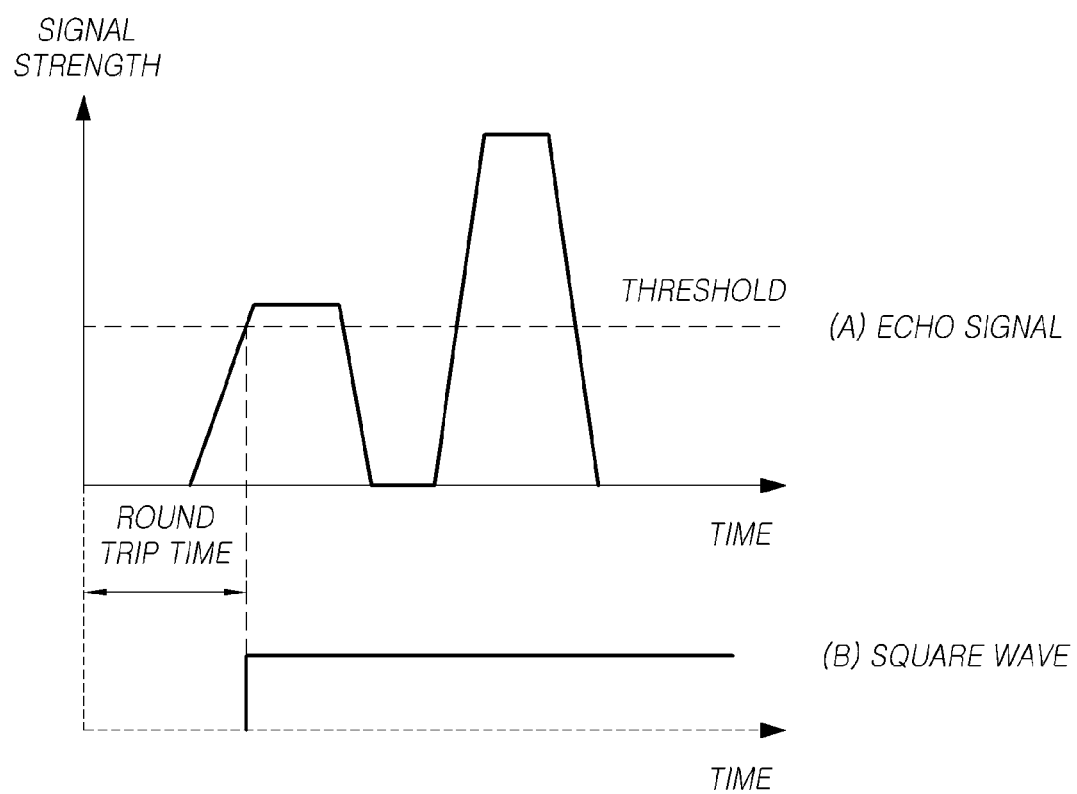
FIG. 4 is a graph for explaining recognition of a parking area by calculating the distance from an object using an echo signal in an existing parking area recognizing method.

As illustrated in FIG. 5A, a first square wave (refer to FIG. 5B) and a second square wave (refer to FIG. 5C) are generated at sections where the signal strength exceeds a first threshold and a second threshold for the echo signal received in the same way as in FIG. 4, and the first square wave and the second square wave are referred to as a multiple echo signal.

Referring to FIG. 5B, a first round trip time, i.e. a round trip time to the time point (i.e. the first rising time point) when a reflection echo signal exceeding a first threshold is received first after an ultrasonic signal is transmitted and a first duration time can be calculated using the first square wave, i.e. an echo signal section having a signal strength exceeding the first threshold.

Referring to the right square wave of FIG. 5B, a second round trip time, i.e. a round trip time to the time point (i.e. the second rising time point) when a reflection echo signal exceeding a first threshold is received second after the ultrasonic signal is transmitted and a second duration time can be calculated using the first square wave, i.e. an echo signal section having a signal strength exceeding the first threshold.

Referring to FIG. 5C, a third round trip time, i.e. a round trip time to the time point (i.e. the first rising time point) when a reflection echo signal exceeding a second threshold is received first after the ultrasonic signal is transmitted and a third duration time can be calculated using the second square wave, i.e. an echo signal section having a signal strength exceeding the second threshold.

Then, meaningless or unavailable information is removed from information regarding the round trip times and the duration times of the multiple echo signal and only available echo signal is extracted to calculate the distances from the object A, the wall, and the object B to accurately recognize a parking area.

An example of removing meaningless or unavailable information from information regarding the round trip times and duration times of the calculated multiple echo signal and extracting only available echo signal will be described below.

An echo signal is determined to be unavailable when the distance between a first distance calculated using the first round trip time to the first rising time point of the first square wave generated through the first threshold and a second distance calculated using the third round trip time to the first rising time point of the second square wave generated through the second threshold deviates from a range.

FIG. 5 illustrates a case in which an echo signal is determined to be unavailable, and it is because a distance calculated using the first round trip time and a distance calculated using the third round trip time is not the same or similar to each other and is large to deviate from a range. Since the strength of an echo signal reflected on a closer object should be larger than the strength of an echo signal reflected on a further object but FIG. 3 illustrates the contrary case, they are determined to be unavailable.

The echo signal may be determined to be unavailable when the first duration time (of a section having a value more than a specific value) of the first square wave generated using the first threshold is no more than a preset available duration time.

In the embodiment of the present invention may selectively apply a method of determining an unavailable echo signal using the round trip times of the first rising time points of the first and second square waves and a method of determining an unavailable echo signal using the duration time of the first square wave, or simultaneously both of them.

Accordingly, a parking area is recognized by excluding an unavailable echo signal, and fixing the distance between the objects (the object A, the wall, and the object B) as a final distance only using available echo signals.

Figure 6A:
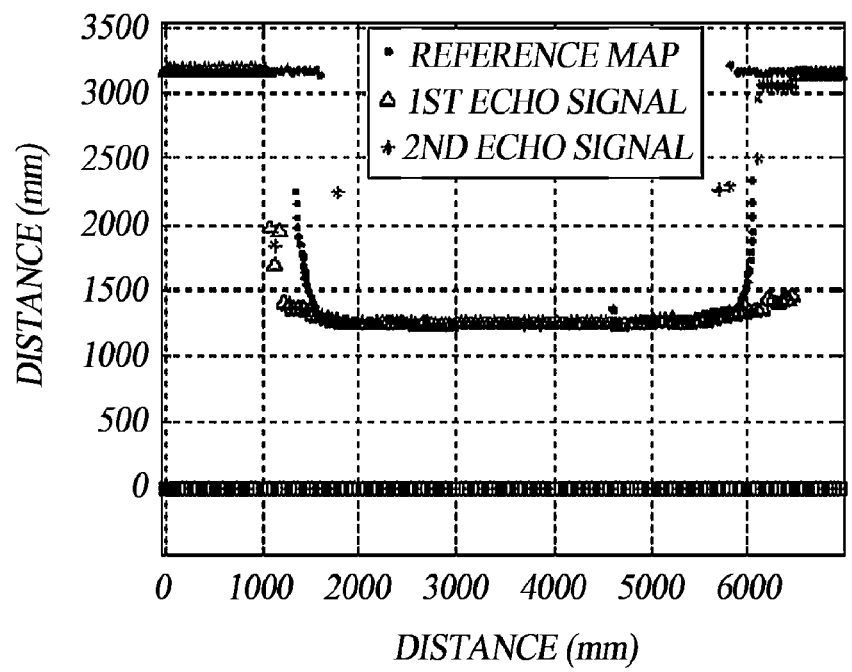
FIGS. 6A and 6B are simulation results obtained by excluding an unavailable echo signal when a parking area is recognized according to the embodiment of the present invention.
Figure 6B:
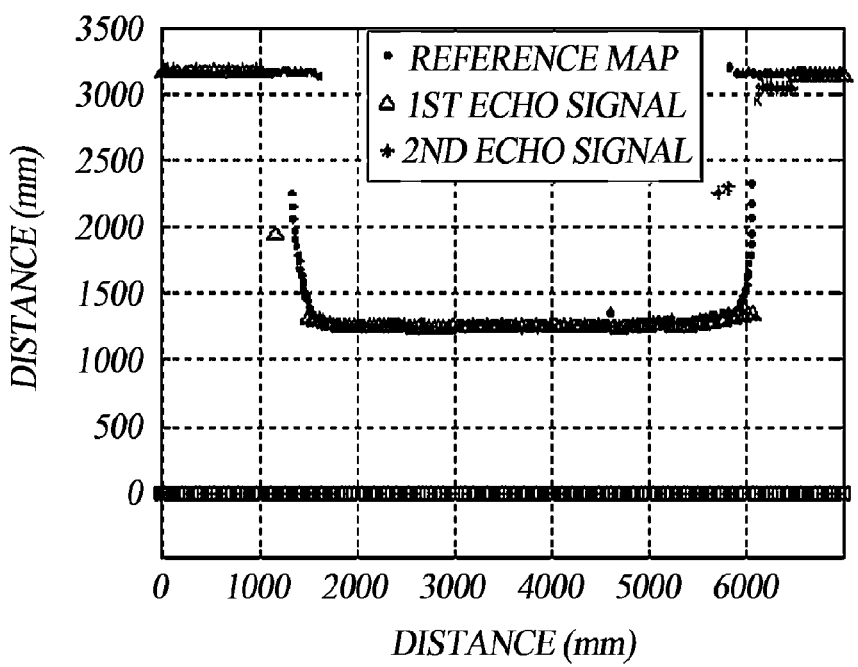

FIGS. 6A and 6B are simulation results obtained by excluding an unavailable echo signal when a parking area is recognized according to the embodiment of the present invention.

FIG. 6A was obtained by an existing technology and FIG. 6B was obtained by the embodiment of the present invention. In the existing technology, there are many unavailable echo signals that do not deviate from a reference map (indicated by .box-solid.) among a first echo signal (indicated by .DELTA.) and a second echo signal (indicated by +), considering the reference map. However, in the embodiment of the present invention, many unavailable echo signals that deviate a reference map are removed to enable more accurate recognition of a parking space.

Accordingly, a precision in recognition of a parking area is enhanced by reducing a measurement error by processing an echo signal received after it is reflected on an object with a multiple echo signal in recognition of the parking area using a sensor such as an ultrasonic sensor or a radar sensor.

Although all the elements constituting the embodiments of the present invention are combined into one or combined with each other to be operated, the present invention is not limited to those embodiments. That is, within the scope of the present invention, at least one of the elements may be selectively combined with each other to be operated. The elements may be realized by independent hardware respectively, but also may be realized by a computer program having a program module performing some or all of one or combined hardware by combining some or all of the elements selectively. The codes and code segments constituting the computer program could be easily reasoned out by those skilled in the art. The computer program may be stored in a computer readable media and be read and executed by a computer to realize the embodiments. The storage media of the computer program may include a magnetic recording medium, an optical recording medium, and a carrier wave medium.

Also, the phraseology and terminology used herein is for the purpose of description and should not be regarded as limiting. The use of "including", "comprising", or "having", and variations thereof herein, is meant to encompass the items listed thereafter and equivalents thereof as well as additional items. Unless otherwise specifically defined herein, all terms including technical or scientific terms are to be given meanings understood by those skilled in the art. Like terms defined in dictionaries, generally used terms needs to be construed as meanings used in technical contexts and are not construed as ideal or excessively formal meanings unless otherwise clearly defined herein.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. Therefore, the embodiments of the invention is given not to limit but to explain the technical spirit of the invention, and the scope of the invention is not limited by the embodiments. The scope of the invention should be construed by the claims, and the equivalents to the invention is construed as included in the scope of the invention.

What is claimed is:

1. A parking area recognizing apparatus comprising:
a signal transmitter transmitting a signal using a sensor;
an echo signal receiver receiving an echo signal for the signal;
a multiple signal generator generating a multiple echo signal using the echo signal based on first and second preset thresholds; and
a parking area recognizer recognizing a parking area by calculating a round trip time and a duration time for the multiple echo signal and selecting an available echo signal based on at least one of the round trip time and the duration time.

2. The parking area recognizing apparatus as claimed in claim 1, wherein the multiple echo signal generator generates a multiple echo signal including a first square wave generated by comparing a signal strength of the echo signal and the first threshold and a second square wave generated by comparing the signal strength of the echo signal with the second threshold and the first threshold is set in advance to be smaller than the second threshold.

3. The parking area recognizing apparatus as claimed in claim 2, wherein the parking area recognizer calculates round trip times and duration times for the first square wave and the second square wave contained in the generated echo signal, and determines that the echo signal is not available when the distance difference calculated using the first rising time points of the first square wave and the second square wave deviates from a range.

4. The parking area recognizing apparatus as claimed in claim 2, wherein the parking area recognizer determines that the echo signal is not available when a duration time for the first square wave is no more than a preset available duration time.

5. A parking area recognizing method comprising the steps of:
transmitting a signal using a sensor;
receiving an echo signal for the signal;
generating a multiple echo signal using the echo signal based on first and second preset thresholds;
calculating a round trip time and a duration time for the multiple echo signal and selecting an available echo signal based on at least one of the round trip time and the duration time; and
recognizing a parking area based on the available echo signal.

* * * * *